(12) United States Patent
Ward et al.

(10) Patent No.: US 8,379,513 B2
(45) Date of Patent: *Feb. 19, 2013

(54) METHOD FOR RECOVERY OF A CONTROLLED FAILOVER OF A BORDER GATEWAY PROTOCOL SPEAKER

(75) Inventors: David D. Ward, Somerset, WI (US); John Scudder, Ann Arbor, MI (US)

(73) Assignee: Cisco Technology, Inc., San Jose, CA (US)

(*) Notice: Subject to any disclaimer, the term of this patent is extended or adjusted under 35 U.S.C. 154(b) by 10 days.

This patent is subject to a terminal disclaimer.

(21) Appl. No.: 13/098,627

(22) Filed: May 2, 2011

(65) Prior Publication Data
US 2011/0213890 A1    Sep. 1, 2011

Related U.S. Application Data

(63) Continuation of application No. 11/253,119, filed on Oct. 17, 2005, now Pat. No. 7,948,873.

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl. ............................ 370/219; 714/11
(58) Field of Classification Search .............. 370/216, 370/217, 218, 219, 220, 242, 243, 244, 245, 370/392, 360; 714/1, 2, 11, 12, 13
See application file for complete search history.

(56) References Cited

U.S. PATENT DOCUMENTS

| | | | | |
|---|---|---|---|---|
| 6,078,957 | A * | 6/2000 | Adelman et al. | 709/224 |
| 6,192,411 | B1 * | 2/2001 | Chan et al. | 709/232 |
| 7,003,692 | B1 * | 2/2006 | Banks et al. | 714/12 |
| 7,236,453 | B2 * | 6/2007 | Visser et al. | 370/219 |
| 7,286,468 | B2 * | 10/2007 | Scudder et al. | 370/219 |
| 7,392,424 | B2 * | 6/2008 | Ho et al. | 714/4.4 |
| 7,406,035 | B2 * | 7/2008 | Harvey et al. | 370/218 |
| 7,894,335 | B2 * | 2/2011 | May | 370/219 |
| 2001/0049731 | A1 * | 12/2001 | Kuusinen et al. | 709/223 |
| 2003/0002497 | A1 * | 1/2003 | Vasudevan | 370/389 |
| 2003/0023892 | A1 * | 1/2003 | Giovanni | 714/2 |
| 2003/0084371 | A1 | 5/2003 | Mongazon-Cazavet et al. | |

(Continued)

OTHER PUBLICATIONS

European Patent Office "Office Action" Received for foreign patent application No. 06836205.2-1525 dated Jun. 10, 2011, 5 pages.

(Continued)

*Primary Examiner* — Ayaz Sheikh
*Assistant Examiner* — Hoang-Chuong Vu
(74) *Attorney, Agent, or Firm* — Hickman Palermo Truong Becker Bingham Wong LLP

(57) ABSTRACT

A method and apparatus for recovering from a controlled failover of a BGP speaker is provided. A user sends, to a network element, a request to switch a designation of an active Border Gateway Protocol (BGP) speaker of the network element from a first BGP speaker to a second BGP speaker. After receiving the request, the network element pauses operation of a transport for BGP. Routing data, which describes a state of a first routing information base (RIB) maintained by the active BGP speaker, is transferred from the first BGP speaker to the second BGP speaker. Thereafter, the first BGP speaker may instruct the second BGP speaker to become the active BGP speaker. After the second BGP speaker becomes the active BGP speaker, the second BGP speaker resumes operation of the BGP transport.

24 Claims, 4 Drawing Sheets

U.S. PATENT DOCUMENTS

| | | | |
|---|---|---|---|
| 2003/0140155 A1* | 7/2003 | Harvey et al. | 709/230 |
| 2003/0140167 A1* | 7/2003 | Harvey et al. | 709/238 |
| 2005/0050136 A1* | 3/2005 | Golla | 709/200 |
| 2005/0078600 A1* | 4/2005 | Rusmisel et al. | 370/217 |
| 2005/0213498 A1* | 9/2005 | Appanna et al. | 370/216 |
| 2005/0265346 A1* | 12/2005 | Ho et al. | 370/392 |
| 2006/0159011 A1* | 7/2006 | Dalal et al. | 370/220 |
| 2006/0164974 A1* | 7/2006 | Ramalho et al. | 370/219 |
| 2006/0198300 A1* | 9/2006 | Li et al. | 370/229 |
| 2009/0219804 A1* | 9/2009 | Cole et al. | 370/218 |

OTHER PUBLICATIONS

Current Claims in European patent application No. 06836205.2-1525, dated Jun. 2011, 7 pages.

* cited by examiner

METHOD FOR RECOVERY OF A CONTROLLED FAILOVER OF A BORDER GATEWAY PROTOCOL SPEAKER

BENEFIT CLAIM; RELATED APPLICATION DATA

This application claims the benefit under 35 U.S.C. §120 as a continuation of U.S. patent application Ser. No. 11/253,119, filed Oct. 17, 2005, now U.S. Pat. No. 7,948,873 the entire contents of which are hereby incorporated herein by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

This application is related to co-pending, commonly assigned U.S. patent application Ser. No. 10/808,040, filed Mar. 24, 2004, entitled "Routing system and method for transparently recovering routing states after a failover or during a software upgrade," invented by Chandrashekhar Appanna et al., the disclosure of which is incorporated by reference in its entirety as if fully set forth herein.

This application is also related to co-pending, commonly assigned U.S. patent application Ser. No. 10/948,732, filed Sep. 22, 2004, entitled "Cooperative TCP/BGP Window Management For Stateful Switchover," invented by Chandrashekhar Appanna et al., the disclosure of which is incorporated by reference in its entirety as if fully set forth herein.

This application is also related to co-pending, commonly assigned U.S. patent application Ser. No. 11/091,316, filed Mar. 14, 2005, entitled "Method and Apparatus For Context-Based Prefix Updates in Border Gateway Protocol," invented by Martin Djernaeset al., the disclosure of which is incorporated by reference in its entirety as if fully set forth herein.

This application is also related to co-pending, commonly assigned U.S. patent application Ser. No. 11/222,523, filed Sep. 8, 2005, entitled "Method and Apparatus for Transferring BGP State Information During Asychronous Startup," invented by Chandrashekhar Appanna.

FIELD OF THE INVENTION

The present invention generally relates to recovering from a controlled failover of a BGP speaker on a network element.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is a path vector routing protocol for inter-Autonomous System routing. The function of a BGP-enabled network element (a BGP host or peer) is to exchange network reachability information with other BGP-enabled network elements. The most commonly implemented version of BGP is BGP-4, which is defined in RFC1771 (published by the Internet Engineering Task Force (IETF) in March 1995).

To exchange routing information, two BGP hosts first establish a BGP peering session by exchanging BGP OPEN messages. The BGP hosts then exchange their full routing tables. After this initial exchange, each BGP host sends to its BGP peer or peers only incremental updates for new, modified, and unavailable or withdrawn routes in one or more BGP UPDATE messages. A route is defined as a unit of information that pairs a network destination with the attributes of a network path to that destination. The attributes of the network path include, among other things, the network addresses (also referred to as address prefixes or just prefixes) of the computer systems along the path.

A BGP host stores information about the routes known to the BGP host in a Routing Information Base (RIB). Depending on the particular software implementation of BGP, a RIB may be represented by one or more routing tables. When more than one routing table represents a RIB, the routing tables may be logical subsets of information stored in the same physical storage space, or the routing tables may be stored in physically separate storage spaces.

As networks grow more complex and the number of BGP routes maintained by a particular network element increase, the consequences of a BGP host device, or the BGP process executing on the BGP host device, becoming inoperable are more severe. For example, in some scenarios, when a BGP host fails, the BGP host loses all information about routes maintained by the failed BGP host. Thus, recovery of the failed BGP host may require retransmission of a large amount of route information from other BGP hosts and the re-computation of a large amount of network reachability information by the recovering BGP host. During the retransmission period, the failed BGP host cannot route network traffic. Therefore, vendors of network gear and their customers wish to deploy BGP in a high availability manner.

One approach for deploying BGP in a high availability manner is referred to as "stateful switchover" or SSO. SSO is typically implemented with network elements that have dual route processors, each of which can host separate but duplicate instances of various software applications. One route processor is deemed Active and the other is deemed Standby. In one implementation of SSO, processes or "speakers" periodically transfer (in a process referred to as "checkpointing") a copy of large amounts of data, from one or more routing tables, from the Active BGP speaker to the Standby BGP speaker. In this way, the Standby BGP speaker may operate, using the same routes as previously used by the Active BGP speaker, when the Active BGP speaker becomes inoperable. Consequently, all data accumulated by the Active BGP speaker must be transferred to the Standby BGP speaker before the Standby BGP speaker can start processing BGP UPDATE messages or perform other substantive BGP functions.

However, this bulk data transfer approach is inefficient and does not scale as the volume of routes maintained by the Active BGP speaker increases. For example, the data structures that are transferred must be converted to messages for purposes of inter-process communications. Therefore, all data structures have to be flattened, i.e., pointers present in the data structures cannot be sent in the form of pointers. Further, as data structures change between versions of software, new messages and converter functions are necessary to provide SSO support between the different versions.

Some implementations of BGP SSO attempt to limit that amount of data that is transferred from the Active BGP speaker to the Standby BGP speaker at a single time by transmitting data that identifies a change made to the Active BGP speaker, from the Active BGP speaker to the Standby BGP speaker, as soon as the change is made to the Active BGP speaker. However, such an approach requires a large amount of overhead in updating the RIB of the Active BGP speaker because the RIB of the Standby BGP speaker must be updated synchronously with the RIB of the Active BGP speaker.

Another approach for deploying BGP in a high availability manner is referred to as "graceful restart." The graceful restart approach involves, for example, two different BGP hosts, denoted host A and host B herein. According to the graceful restart approach, if host A determines that host B may have become inoperable, host A starts a first timer that reflects the amount of time in which host A must receive a communication from host B before host A concludes that host B has become inoperable. If host A does receive a communication from host B before the expiration of the first timer, then host A starts a second timer that reflects the amount of time in which host B must send all BGP UPDATE messages to host A. On the other hand, if host A does not receive a communication from host B before the expiration of the first time, then host A updates the RIB it maintains to reflect that host B is not reachable.

Unfortunately, as a result of the time involved in updating the RIBs of each BGP speaker through the exchange of BGP UPDATE messages, the graceful restart approach requires several minutes or more before host A and host B are both updated after one of the hosts comes back online. Further, it is possible that host A would not be notified of a topology change in the network, because host B will not be able to communicate any BGP UPDATE messages to host A if host B is down.

Thus, there is a clear need for an improved technique for recovering from the failover of a BGP speaker on a network element which does not experience the disadvantages discussed above.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
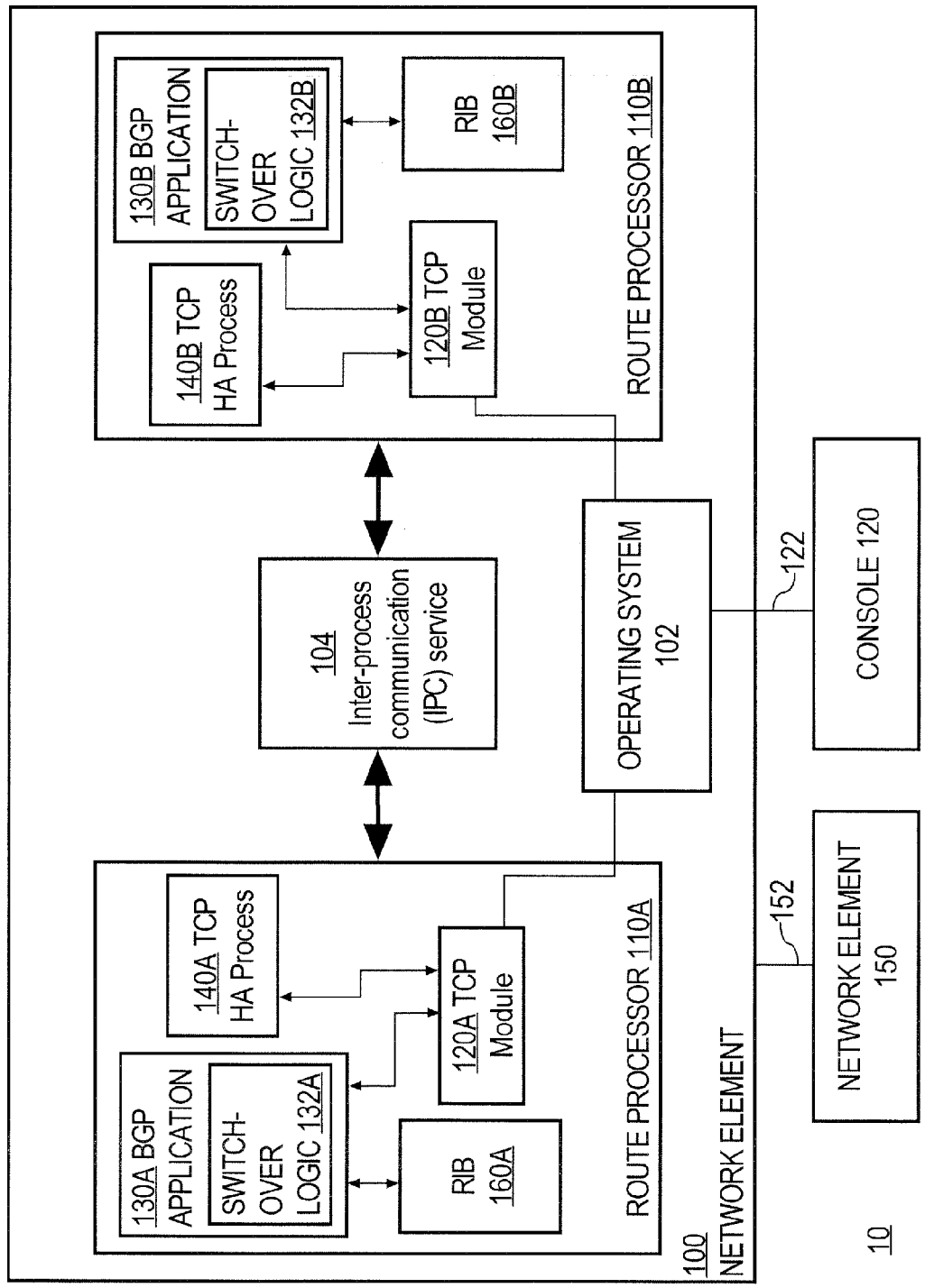
FIG. 1 is a block diagram that illustrates an overview of a network element that may be used to implement an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Embodiments operate, at least in part, under the recognition that the amount of time required to recover from the failover of a Border Gateway Protocol (BGP) speaker may be reduced when the failover of the BGP speaker is the result of a controlled event. A controlled event refers to any event, initiated by a user, which requires shutting down a BGP speaker, including but not limited to a hardware upgrade, a software upgrade, or turning on a feature which requires restarting a BGP session maintained by the BGP speaker. Embodiments provide a mechanism for recovering from a controlled failover of a BGP speaker. Such a recovery may be performed by a user sending a command to a network element to pause a transport of BGP messages to the network element, transferring the BGP state and the transport state of an active BGP speaker to a standby BGP speaker, instructing the standby BGP speaker to become the active BGP speaker, and thereafter unpausing the transport of BGP messages to the network element. In this way, the active BGP speaker may be shut down in a controlled manner and the standby BGP speaker may synchronize to the active BGP speaker while minimizing the time in which the network element does not process BGP messages from peers.

More particularly, in one embodiment, a user may send, to a network element, a request to switch a designation of an active BGP speaker of the network element from a first BGP speaker to a second BGP speaker. In response to receiving the request, the network element pauses operation of a transport for BGP. For example, TCP may serve as a transport, and the network element may decide not to advance the window size of TCP segments sent to a peer. After the peer sends, to the network element, an amount of data up to size indicated by the window size, the peer will not send additional TCP segments to the network element until the network element advertises a positive window size. In this way, the network element may cause the peer to cease sending to the network element TCP segments carrying BGP messages. Other techniques for pausing the operation of a transport for BGP may also be used.

Routing data, which describes a state of a first routing information base (RIB) maintained by the first BGP speaker, is transferred to the second BGP speaker. Any of several transfer approaches may be used. As a result of transferring the routing data, a second RIB, maintained by the second BGP speaker, becomes synchronized to the first RIB. After the second RIB is synchronized to the first RIB, the first BGP speaker may instruct the second BGP speaker to become the active BGP speaker. After the second BGP speaker becomes the active BGP speaker, the second BGP speaker resumes operation of the BGP transport.

Having described a high level overview of one embodiment, an architecture overview of another embodiment will be presented below.

Architecture Overview

FIG. 1 is a block diagram that illustrates system 10 that may be used to implement an embodiment. FIG. 1 depicts network elements 100 and 150 and console 120. A network element refers to any machine, such as a router or a switch, which resides on a network. Network elements 100 and 150 may exchange communications with each other over communications link 152. For example, network elements 100 and 150 may exchange TCP segments carrying BGP messages. Communications link 152 may be implemented by any medium or mechanism that provides for the exchange of data between network elements 100 and 150.

An administrator may wish to configure a particular network element, such as network element 100. In doing so, the administrator may use console 120 to issue commands to network element 100. Console 120 may be implemented by any machine that allows a user to transmit data to a particular network element over communications link 122, e.g., console 120 may be implemented by a computer operationally connected to network element 100 or a web browser that is indirectly coupled to network element 100. Communications link 122 may be implemented by any medium or mechanism that provides for the exchange of data between console 120 and network element 150. Examples of communications links 122 and 152 include, without limitation, a network such as a Local Area Network (LAN), Wide Area Network (WAN), Ethernet or the Internet, or one or more terrestrial, satellite or wireless links.

Network element 100 comprises an operating system 102. Operating system 102 is software designed to control the hardware of network element 100 in order to allow users and application programs to make use of it. For example, operating system 102 may receive a command from console 120 over communications link 122, and thereafter send the command to a software application executing on network device 100 for processing.

In one embodiment, network element 100 is a dual route processor network element that participates in a packet-switched network. Each of the dual route processors of network element 100 can host separate but duplicate instances of various software applications relating to packet routing or forwarding. To illustrate, as shown in FIG. 1, one of the dual route processors of network element 100, and the applications and data supported by it, is identified as route processor 110A and the other dual route processor, and the applications and data supported by it, is identified as route processor 110B.

In one embodiment, route processor 110A hosts a TCP module 120A that runs or controls a TCP high-availability (HA) process 140A and a BGP application 130A. Route processor 110B hosts a TCP module 120B, BGP application 130B, and TCP HA process 140B. TCP modules 120A, 120B and TCP HA processes 140A, 140B provide transport control protocol functionality. BGP applications 130A and 130B provide border gateway protocol functionality. In alternative embodiments not depicted in FIG. 1, route processor 110A and route processor 110B may host other protocols and applications. For example, SCTP may serve as a transport. Thus, TCP modules 120A, 120B, TCP HA processes 140A, 140B, and BGP applications 130A, 130B are shown only as examples and not as requirements.

BGP Applications 130A and 130B each comprise switchover logic 132A and 132B respectively. Switchover logic 132A and 132B are responsible for recovering from a controlled failover of a BGP speaker. The operation of switchover logic 132A and 132B shall be described in greater detail below with reference to FIGS. 2 and 3.

Route processor 110A and route processor 110B may be arranged in a redundant or fault-tolerant configuration. To illustrate, route processor 110A may initially be designated an "active" route processor. Thus, BGP application 130A would be correspondingly designated an "active" BGP speaker. Similarly, route processor 110B may initially be designated a "standby" route processor. Thus, BGP application 130B would be correspondingly designated a "standby" BGP speaker. When route processor 110A is active, and route processor 110B is standby, all BGP functionality at network element 100 is performed by route processor 110A, and in the case that route processor 110A becomes inoperable (either for a controlled event or an unplanned event), then route processor 110B assumes the position of the active route processor, and subsequently performs all BGP functionality at network element 100.

Route processor 110A and route processor 110B each comprises a Routing Information Base (RIB) 160A and 160B respectively. RIB 160A stores all the routes known to BGP application 130A, and RIB 160B stores all the routes known to BGP application 130B.

An inter-process communication (IPC) service 104 is coupled between route processor 110A and route processor 110B. The IPC 104 provides a means for route processor 110A and route processor 110B to exchange data and instructions.

The arrangement of FIG. 1 represents just one possible context for applying the approaches described herein. The approaches herein are generally applicable to any other context in which BGP services are supported by a network element having a dual processor.

Having described the architecture overview of an embodiment, an approach for recovering from a controlled failover of a BGP speaker is presented below.

Recovering from a Controlled Failover of a BGP Speaker

Figure 2:
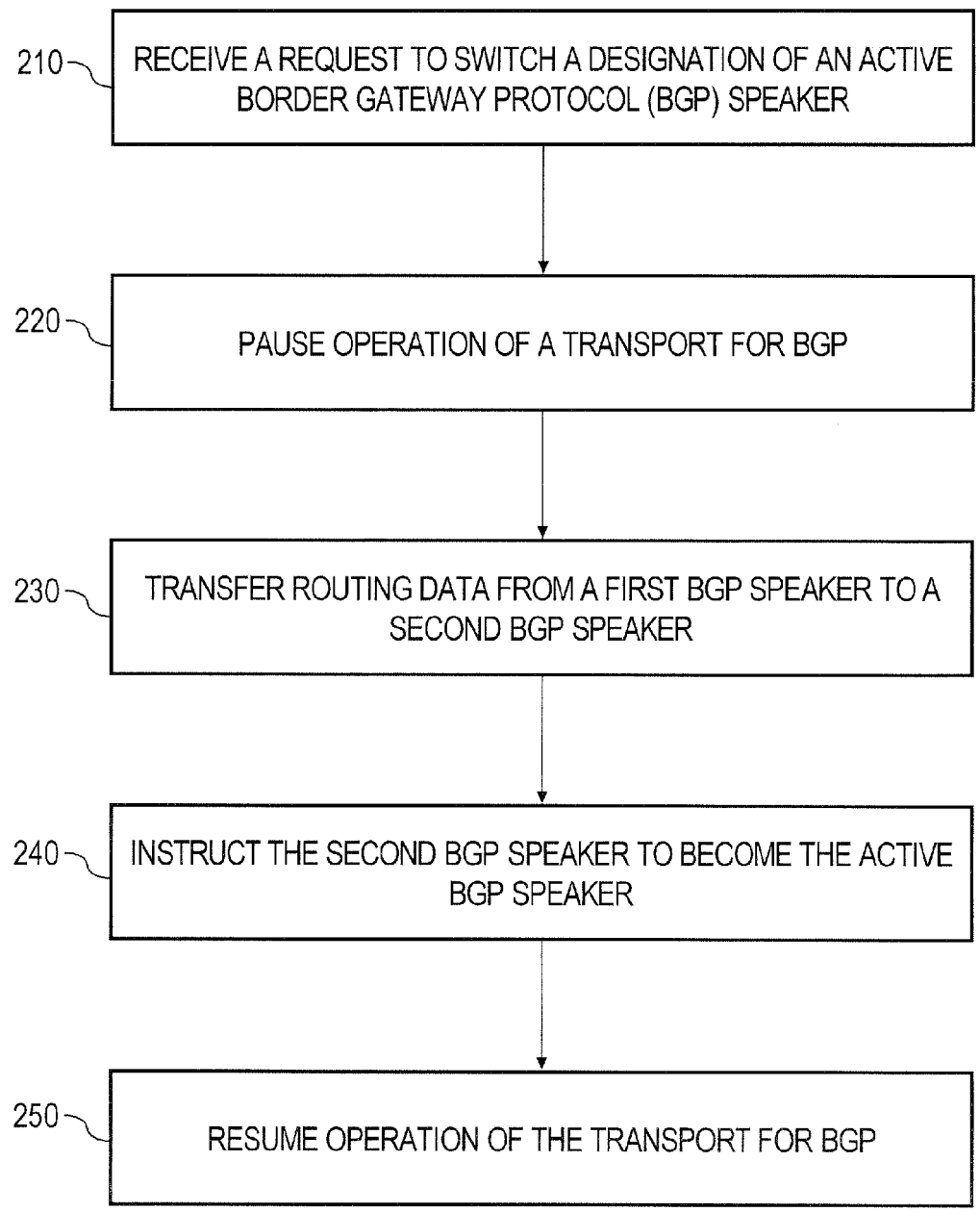
FIG. 2 is a flowchart illustrating the functional steps performed by an embodiment.

The process of recovering from a controlled failover of a BGP speaker according to an embodiment is described below with reference to FIG. 2. For purposes of illustrating a clear example, and not as a limitation, the description of the steps of FIG. 2 makes reference to the system 10 of FIG. 1. While the steps of FIG. 2 are depicted in a particular sequence, the particular sequence of steps depicted in FIG. 2 is merely to facilitate the explanation of embodiments of the invention. In other embodiments, the sequence of steps in recovering from a controlled failover of a BGP speaker may differ from those depicted in FIG. 2. For example, as explained below, in some embodiments the step of transferring routing data (step 230) may be performed in parallel to one or more other steps depicted in FIG. 2.

Initially, in step 210, a request to switch a designation of an active border gateway protocol (BGP) speaker from a first BGP speaker to a second BGP speaker is received. For example, route processor 110A may be currently designated as the active route processor. The request of step 210 may be a request to switch the designation of an active route processor from route processor 110A to route processor 110B. For ease of explanation, the steps of FIG. 2 are described below assuming that the request of step 210 is a request to switch the designation of an active route processor from route processor 110A to route processor 110B.

Switching the designation of an active route processor correspondingly switches the designation of an active BGP speaker. To illustrate, if the request of step 210 is a request to switch the designation of an active route processor from route processor 110A to route processor 110B, then BGP application 130B becomes the active BGP speaker. In other words, the active BGP speaker is the BGP speaker of the active route processor, and so a request may request to switch a designation of an active BGP speaker by requesting the designation of an active route processor be switched from route processor 110A to route processor 110B. Other embodiments may expressly request that a designation of an active BGP speaker be switched from one particular BGP speaker (such as BGP application 130A) to another particular BGP speaker (such as BGP application 130B).

A user, such as an administrator, may issue the switchover request of step 210 using console 120. For example, the request of step 210 may be implemented as a command to shut down the route processor 110A, and cause route processor 110B to become the active route processor. In an embodiment, the command may be a Command Line Interface (CLI) command that a user issues through console 120. The command may be sent over communications link 122 and subsequently received by the operating system 102 of network element 100. The operating system 102, upon receiving the command, communicates the command to switchover logic associated with the active BGP speaker. For example, if BGP application 130A is the active BGP speaker, then operating system 102, upon receiving the command, communicates the command to switchover logic 132A. After the request to switch the designation of the active BGP speaker is received, processing proceeds to step 220. Alternately, a program or process may issue request 210.

In step 220, the operation of a transport of BGP to network element 100 is paused. The operation of a transport of BGP to network element 100 may be paused using a variety of different approaches. Three such approaches will be discussed herein, although any approach for pausing the operation of a transport of BGP to network element 100 may be employed by embodiments of the invention. For ease of explanation, the performance of step 220 shall be explained below with reference to pausing operation of a transport of BGP from network element 150 to network element 100, although the techniques below for pausing the operation of a transport for BGP may be used with any number of peers of network element 100.

In an embodiment, a transport-layer protocol may be used to pause the operation of the transport of BGP. Networks use transport-layer protocols to regulate the movement of data packets among network elements, such as network elements 100 and 150. Transmission Control Protocol ("TCP") is a foundational protocol that provides transport-layer services. TCP is defined in Internet Engineering Task Force (IETF) Request for Comments (RFC) 793. TCP may be used to carry BGP messages between BGP peers. A software implementation of TCP is often known as a TCP stack. A TCP stack may be implemented in a router, switch, or other network element of network infrastructure, or in a personal computer, server, workstation, or other end station device. The term "host" encompasses both network elements and end station devices. Two devices that have respective TCP stacks and communicate according to TCP are often called TCP peers or peer hosts. The basic unit of communication under TCP is a segment, which is encapsulated in an Internet Protocol (IP) packet when IP is the network layer protocol.

Data communication protocols, such as TCP, often provide a way for a receiving host to signal a sending host that the receiving host cannot accept more data, for example, because receiving buffers of the receiving host are full. To provide such signaling, TCP defines a segment attribute termed the window size. When a receiving host receives a data segment but cannot accept further data thereafter, the receiving host sends an acknowledgment TCP segment ("ACK segment") that contains a window size value of zero. A sending host, upon receiving a window size value of zero, understands that the receiving host cannot accept more data, and therefore the sending host must not send any more data to the receiving host.

However, the sending host needs a way to determine, subsequently, when the receiving host is again ready to receive data. In one approach, a sending host sends a probe segment that contains one byte of additional data. The purpose of the probe segment is to induce the receiving host to send back another ACK segment that contains an updated window size value. If the receiving host truly cannot accept more data, then the one byte of data in the probe segment may be lost, and re-transmission will be required.

According to a first approach (the "closing the window upon consumption" approach) for pausing the operation of a transport for BGP to network element 100, network element 100 may cease advancing the window size advertised by TCP segments sent from network element 100 to peers, such as network element 150. In other words, the advertised window size is decremented upon receipt of data from network element 150, and the window size is no longer incremented upon capacity of network element 100 becoming available for receiving data. Over time, as network element 150 sends data to network element 100, the advertised window size of TCP segments sent from network element 100 to network element 150 will decrease, until the window size shrinks to zero. The act of sending an amount of data to a host equal to the amount of data advertised by a window size from that host is referred to as "consuming" the window size.

After network element 150 has consumed the window size, network element 100 will advertise a window size of zero in TCP segments sent to network 150. Receipt of the TCP segment advertising a window size of zero by network element 150 will cause network element 150 to cease transmitting TCP segments to network element 100. In effect, network element 150 will become "flow blocked," or unable to send additional TCP segments to network element 100. By flow blocking network element 150, network element 100 may pause the operation of the transport for BGP from network element 150 to network element 100.

A second approach (the "not acknowledging TCP segments" approach) for pausing the operation of a transport for BGP to network element 100 involves network element 100 ceasing to acknowledge TCP segments received from network element 150. In the "not acknowledging TCP segments" approach, network element 150 will continue retransmitting the unacknowledged TCP segments. As explained below, after the standby BGP speaker of network element 100 becomes the active BGP speaker of network element 100, the active BGP speaker of network element 100 will resume acknowledging the TCP segments from network element 150.

According to a third approach ("the message approach") for pausing the operation of a transport for BGP to network element 100, switchover logic 132A of network element 100 may send a message to network element 150. The message, received by network element 150, may inform network element 150 that network element 100 can no longer receive any BGP messages or transport segments from network element 150. Network element 100 may also, in step 220, send other messages to other peers to pause the operation of a transport of BGP from the other peers to network element 100.

To illustrate, in an embodiment employing the message approach, a TCP segment is sent, from network element 100 to network element 150, which advertises a window size of zero. Further, network element 100 does not send any ACK segments to network element 150 in response to any probe segments sent by network device 150 to network device 100. Receipt of the TCP segment advertising a window size of zero by network element 150 will cause network element 150 to become flow blocked. The message approach differs from the closing the window upon consumption approach in that, in the message approach, the message is immediately sent regardless of what prior window size was previously advertised, but not consumed.

In an embodiment, the switchover logic associated with the active BGP speaker may instruct the TCP module of the active route processor to send the TCP segment advertising a window size of zero to network element 150. For example, in an embodiment, switchover logic 132A may instruct TCP module 120A to send a TCP segment advertising a window size of zero to network element 150. Further, switchover logic 132A may instruct TCP HA process 140 to not send any ACK segments to network element 150 while the transport of BGP is paused.

In some contexts, it may not be desirable to advertise a window size of zero if a larger window was previously advertised which the peer has not yet consumed (otherwise known as "reneging a window size"). For example, reneging on a window size may cause a peer to abort a connection. After a message that pauses operation of a transport of BGP is sent to the peer, processing proceeds to step 230.

In step 230, routing data that describes a state of a first routing information base (RIB) is transferred from a first BGP speaker to a second BGP speaker. For example, routing data that describe the current state of RIB 160A may be transferred from route processor 110A to route processor 110B. The routing data received at route processor 110B may be used to update RIB 160B. Thus, after all the routing data is transferred in step 230, RIB 160B becomes synchronized to RIB 160A.

Embodiments of the invention may perform step 230 in a variety of ways. Several approaches for performing step 230 shall be discussed below with reference to FIG. 3. Some embodiments of the invention may transfer routing data prior to the performance of step 210 or in parallel to other steps depicted in FIG. 3.

In an embodiment, during step 230, TCP connection data that describes the state of TCP connections maintained by the first BGP speaker may also be transferred. Non-limiting examples of TCP connection data includes the socket number of a TCP session, a file descriptor, and the state of a TCP session with a peer. In an embodiment, when the TCP connection data is transferred from route processor 110A to route processor 110B, the TCP state is frozen (i.e., the state no longer changes) at route processor 110A. TCP HA Process 140B is updated to reflect the TCP connection data transferred to route processor 110B. In this way, route processor 110B may transmit TCP segments to peers of network element 100 using the transferred connection data once route processor 110B is instructed to become the active route processor.

After switchover logic 132A determines that all the routing data has been transferred to route processor 110B (in other words, RIB 160B is synchronized to RIB 160A), then processing proceeds to step 240.

In step 240, the standby BGP speaker is instructed to become the active BGP speaker. Step 240 may be performed by switchover logic 132A instructing switchover logic 132B to cause BGP application 130B to become the active BGP speaker. Switchover logic 132A may instruct switchover logic 132B over IPC 104.

As explained above, the identity of the active BGP speaker corresponds to the active route processor, so in an embodiment, the performance of step 240 may be performed by switchover logic 132 instructing route processor 110B that route processor 110B is to become the active route processor.

In an embodiment, after BGP application 130B receives the instruction, from BGP application 130A, to become the active BGP speaker, BGP application 130B becomes the active BGP speaker. BGP application 130B sends an acknowledgement to BGP application 130A that BGP application 130B is preparing to become the active BGP speaker.

In an embodiment, after BGP application 130A receives the acknowledgement from BGP application 130B, BGP application 130A shuts down. Also, in other embodiments, in addition to BGP application 130A shutting down in response to receiving the acknowledgement, other applications of route processor 110A, or route processor 110A itself, may also shut down. After route processor 110A, or any applications supported by route processor 110A, shuts down, a user may perform activities on route processor 110A, such as installing new hardware or software. After the performance of step 240, processing proceeds to step 250.

In step 250, operation of the transport for BGP to network element 100 is resumed. As in step 220, the performance of step 250 may be performed using a variety of different approaches. Naturally, the particular approach taken to pause the operation of a transport for BGP performed in step 220 will affect how the operation of the transport for BGP is resumed in the performance of step 250.

In an embodiment employing the closing the window upon consumption approach or the message approach, the performance of step 250 may be performed by network element 110 transmitting to network element 150 a TCP ACK segment that contains an updated window size value that is positive. The updated positive window size value reflects the amount of data that the second BGP speaker is capable of receiving from the peer. As a result of network element 150 receiving a TCP segment advertising a positive window size, network element 150 will resume sending TCP segments to network element 100 in accordance with the updated window size.

In an embodiment employing the "not acknowledging TCP segments" approach, the operation of the transport for BGP may be resumed in step 250 by the active BGP speaker of network element 100 acknowledging the TCP segments from network element 150.

Advantageously, embodiments allow a user to submit a request to the network element 100 to cause the active BGP speaker to switch from route processor 110A to route processor 110B in a manner that minimizes the disruption to BGP processing by network elements 100 and 150. Further, the active BGP speaker may be switched, in embodiments, from route processor 110A to route processor 110B in a matter of seconds, as opposed to the several minutes typical of prior approaches. Also, the approaches described herein scale for use with RIBs storing a large volume of routes.

Transferring Routing Data

Figure 3:
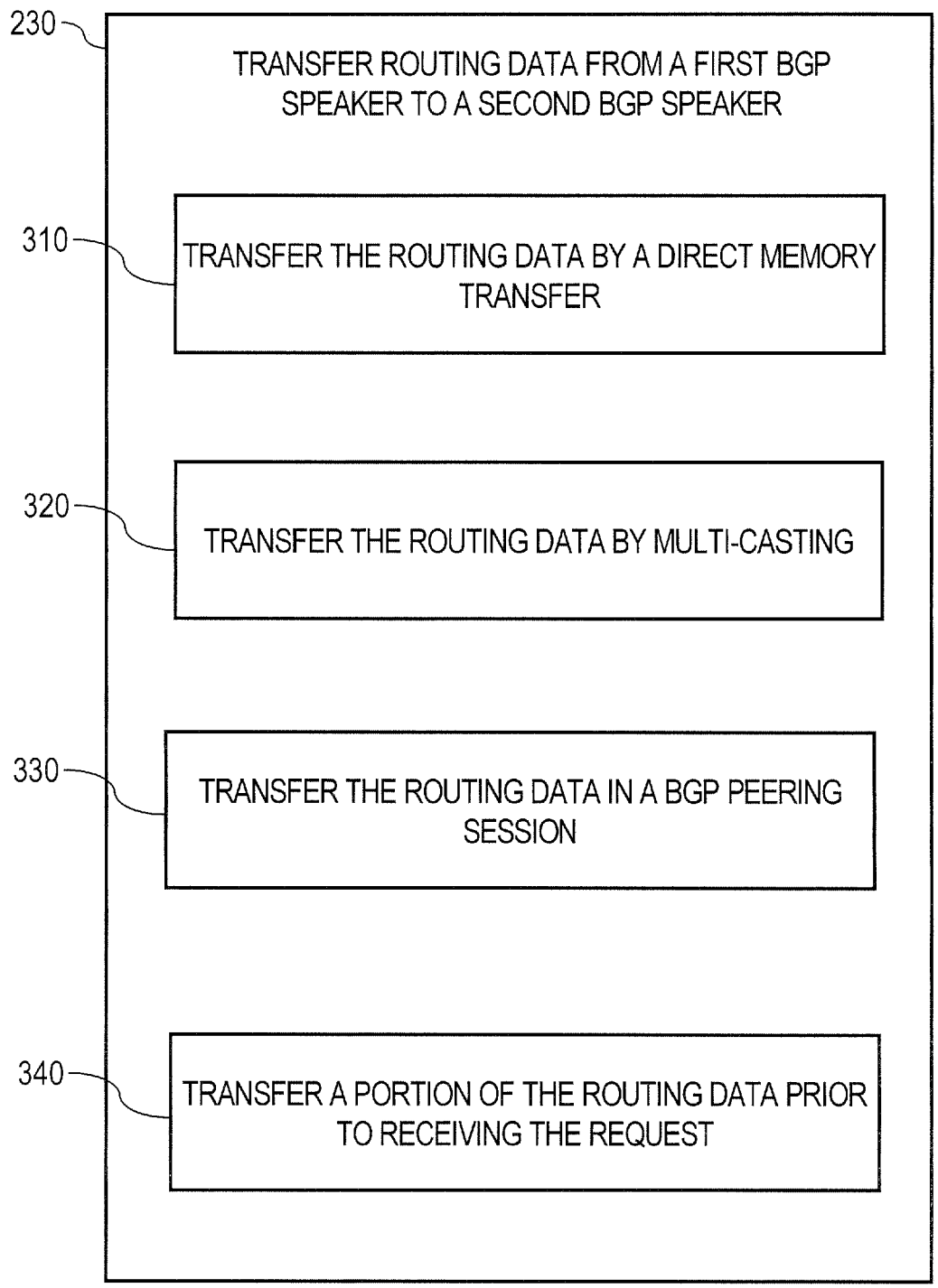
FIG. 3 is a graphical depiction of various ways of transferring routing data according to several embodiments.

Embodiments may perform step 230 in a variety of ways. FIG. 3 is a graphical depiction of various options for transferring routing data according to several embodiments. An embodiment may transfer routing data in step 230 of FIG. 2 by performing any of the options depicted in FIG. 3. The options of FIG. 3 are not meant to depict all the ways in which embodiments may transfer routing data from one BGP speaker to another BGP speaker, as other ways, not depicted in FIG. 3, may be employed. Further, as explained below, the options depicted in FIG. 3 are not meant to be mutually exclusive, e.g., the performance of step 340 may also involve the performance of step 310 or step 330.

According to option 310, routing data is transferred by a direct memory transfer between route processors. For example, option 310 may be performed by route processor 110A transferring routing data to route processor 110B by direct memory transfer.

According to option 320, routing data is transferred by multi-casting received BGP messages carried in TCP segments to both the first BGP speaker and the second BGP speaker. In such an embodiment, the BGP application 130A and BGP application 130B may both listen to the same socket of TCP HA process 140A. Thus, in effect, each TCP segment received by TCP HA process 140A is sent to BGP application 130A and to BGP application 130B, thereby allowing RIB 160A and 160B to be updated simultaneously.

According to option 330, routing data is transferring in a BGP peering session. In effect, BGP application 130A may interact with BGP application 130B using a BGP peering session as if BGP application 130B was located remotely across the Internet. In an embodiment, conventional BGP UPDATE messages may be used to transferring the routing data in a BGP peering session.

According to option 340, a portion of the routing data is transferred prior to the performance of step 210. Prior to receiving the request of step 210, a first portion of routing data may be transferred from BGP application 130A to BGP application 130B in a process referred to as a "lazy transfer." In a lazy transfer, routing data is transferred whenever the route processor 110A has available processing resources that are not otherwise utilized. A lazy transfer may be performed by a direct memory transfer (as in option 310) or using a BGP peering session (as in option 330). In this way, BGP application 130B may update RIB 160B whenever routing data is transferred to the BGP application 130B in a lazy transfer.

At the time the request of step 210 is received by the network element 100, a second portion of routing data, corresponding to all the routes of RIB 160A that have not yet been transferred in a lazy transfer, is transferred to BGP application 130B. The second portion of routing data may also be transferred using a direct memory transfer or in a BGP peering session. Once BGP application 130B receives the second portion of routing data, BGP application 130B updates RIB 160B to become synchronized to RIB 160A.

Transmitting BGP KEEPALIVE Messages to Peers

In an embodiment, the active BGP speaker continues to send one or more BGP KEEPALIVE messages to peers during the sending and transferring steps. For example, in an embodiment, BGP application 130A continues to send one or more BGP KEEPALIVE messages to network element 150 during steps 320 and 330.

In such an embodiment, a BGP KEEPALIVE message is sent to a particular peer after TCP connection data, that describes the state of a TCP connection to the particular peer, is transferred from the first route processor to the second route processor. Since the TCP state is frozen at route processor 110A when TCP connection data is transferred from route processor 110A to route processor 110B, a BGP KEEPALIVE message may only be sent to a peer after the TCP connection data, for that peer, is transferred. To illustrate, after TCP connection data, for a TCP session associated with network element 150, is transferred from BGP application 130A to BGP application 130B in step 230, network element 100 may send a BGP KEEPALIVE message to network element 150.

In this way, network element 150 may be informed that network element 100 is still operational. Thus, when network element 150 receives the BGP KEEPALIVE message from network element 100, network element 150 maintains a BGP connection to network element 100 during the time when the standby route processor of network element 100 is restarting as the active route processor of network element 100.

Implementing Mechanisms

Figure 4:
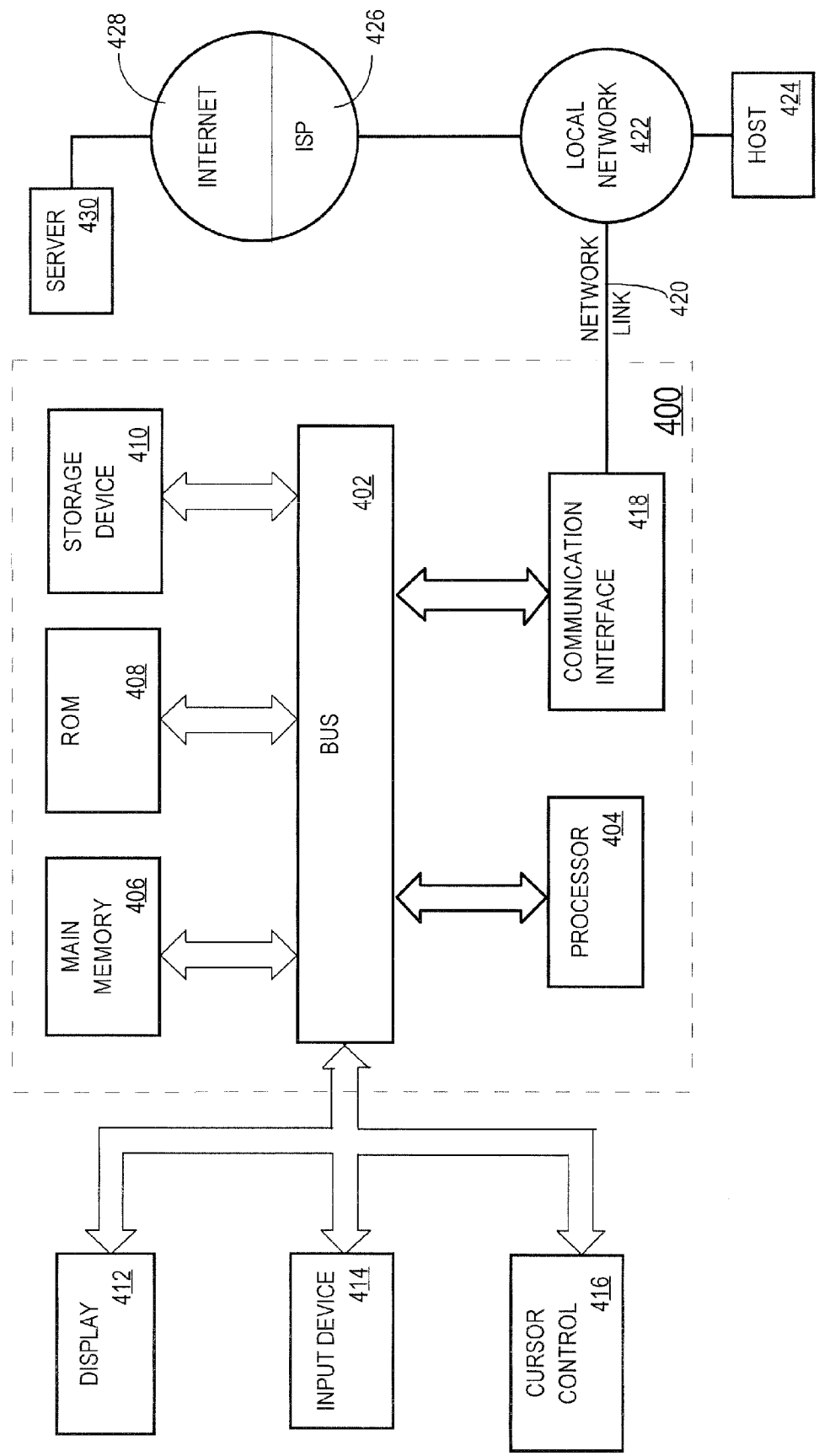
FIG. 4 is a block diagram that illustrates a computer system upon which an embodiment may be implemented.

In an embodiment, network elements 100 and 150, as well as console 120, may each be implemented on a computer system. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic, light, or electromagnetic waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving, at a network element comprising one or more processors, a request to switch a designation of an active Border Gateway Protocol (BGP) speaker of the network element from a first BGP speaker of the network element to a second BGP speaker of the network element, wherein the active BGP speaker processes all BGP messages received at the network element;
    in the network element, in response to receiving the request, the active BGP speaker pausing operation of a transport-layer protocol for BGP to the network element without terminating an associated transport-layer protocol connection;
    synchronizing a second routing information base (RIB), maintained by the second BGP speaker to a first RIB by transferring routing data, which describes a state of the first RIB, from the first BGP speaker to the second BGP speaker;
    wherein synchronizing the second RIB comprises:
        prior to receiving the request, transferring first data that identifies a first portion of routes in the first routing information base (RIB) to the second BGP speaker when the first BGP speaker has available processing resources which are not otherwise utilized;
        after receiving the request, transferring second data that identifies all remaining routes, in the first routing information base (RIB) that are not identified in the first data, to the second BGP speaker in a BGP peering session;
    instructing the second BGP speaker to become the active BGP speaker;
    after the second BGP speaker becomes the active BGP speaker, resuming operation of the transport-layer protocol to the network element.

2. The method of claim 1, wherein pausing operation of the transport-layer protocol comprises ceasing to advance a window size advertised by TCP segments sent from the network element to a peer.

3. The method of claim 1, wherein pausing operation of the transport-layer protocol comprises ceasing to acknowledge TCP segments received, by the network element, from a peer.

4. The method of claim 1, wherein pausing operation of the transport-layer protocol comprises sending, to a peer, a TCP segment that advertises a window size of zero.

5. The method of claim 1, further comprising the network element shutting down the first BGP speaker in response to the first BGP speaker receiving a message, from the second BGP speaker, indicating that the second BGP speaker became the active BGP speaker.

6. The method of claim 1, further comprising transferring the routing data by multi-casting received BGP messages carried in TCP segments to both the first BGP speaker and the second BGP speaker.

7. The method of claim 1, wherein each of the first BGP speaker and the second BGP speaker executes on a different processor of the network element.

8. The method of claim 1, further comprising transferring, from the first BGP speaker to the second BGP speaker, TCP connection data that describes the state of TCP connections maintained by the first BGP speaker.

9. The method of claim 8, further comprising the active BGP speaker continuing to send one or more BGP KEEPALIVE messages to a peer during the steps of pausing operation of the transport-layer protocol for BGP and transferring the routing data.

10. The method of claim 9, further comprising sending each BGP KEEPALIVE message, of the one or more BGP KEEPALIVE messages, to a particular peer after transferring TCP connection data, that describes the state of a TCP connection to the particular peer, from the first BGP speaker to the second BGP speaker.

11. The method of claim 1, further comprising, in the resuming operation of the transport-layer protocol, the network element acknowledging TCP segments received, by the network element, from a peer.

12. The method of claim 1, wherein the resuming operation of the transport-layer protocol comprises the network element sending, to a peer, a TCP segment that advertises a positive window size that reflects an amount of data that the second BGP speaker is capable of receiving from the peer.

13. A non-transitory machine-readable storage device storing one or more sequences of instructions, wherein execution of the one or more sequences of instructions by one or more processors causes:
 receiving, at a network element comprising one or more processors, a request to switch a designation of an active Border Gateway Protocol (BGP) speaker of the network element from a first BGP speaker of the network element to a second BGP speaker of the network element, wherein the active BGP speaker processes all BGP messages received at the network element;
 in the network element, in response to receiving the request, the active BGP speaker pausing operation of a transport-layer protocol for BGP to the network element without terminating an associated transport-layer protocol connection;
 synchronizing a second routing information base (RIB), maintained by the second BGP speaker to a first RIB by transferring routing data, which describes a state of the first RIB, from the first BGP speaker to the second BGP speaker;
 wherein synchronizing the second RIB comprises:
  prior to receiving the request, transferring first data that identifies a first portion of routes in the first routing information base (RIB) to the second BGP speaker when the first BGP speaker has available processing resources which are not otherwise utilized;
  after receiving the request, transferring second data that identifies all remaining routes, in the first routing information base (RIB) that are not identified in the first data, to the second BGP speaker in a BGP peering session;
 instructing the second BGP speaker to become the active BGP speaker;
 after the second BGP speaker becomes the active BGP speaker, resuming operation of the transport-layer protocol to the network element.

14. The machine-readable storage device of claim 13, further comprising sequences of instructions which when executed cause pausing operation of the transport-layer protocol to comprise ceasing to advance a window size advertised by TCP segments sent from the network element to a peer.

15. The machine-readable storage device of claim 13, further comprising sequences of instructions which when executed cause ceasing to acknowledge TCP segments received, by the network element, from a peer.

16. The machine-readable storage device of claim 13, further comprising sequences of instructions which when executed cause sending, to a peer, a TCP segment that advertises a window size of zero.

17. The machine-readable storage device of claim 13, further comprising sequences of instructions which when executed cause the network element shutting down the first BGP speaker in response to the first BGP speaker receiving a message, from the second BGP speaker, indicating that the second BGP speaker became the active BGP speaker.

18. The machine-readable storage device of claim 13, further comprising sequences of instructions which when executed cause transferring the routing data by multi-casting received BGP messages carried in TCP segments to both the first BGP speaker and the second BGP speaker.

19. The machine-readable storage device of claim 13, wherein each of the first BGP speaker and the second BGP speaker executes on a different processor of the network element.

20. The machine-readable storage device of claim 13, further comprising sequences of instructions which when executed cause transferring, from the first BGP speaker to the second BGP speaker, TCP connection data that describes the state of TCP connections maintained by the first BGP speaker.

21. The machine-readable storage device of claim 20, further comprising sequences of instructions which when executed cause the active BGP speaker continuing to send one or more BGP KEEPALIVE messages to a peer during the steps of pausing operation of the transport-layer protocol for BGP and transferring the routing data.

22. The machine-readable storage device of claim 21, further comprising sequences of instructions which when executed cause sending each BGP KEEPALIVE message, of the one or more BGP KEEPALIVE messages, to a particular peer after transferring TCP connection data, that describes the state of a TCP connection to the particular peer, from the first BGP speaker to the second BGP speaker.

23. The machine-readable storage device of claim 13, further comprising sequences of instructions which when executed cause, in the resuming operation of the transport-layer protocol, the network element acknowledging TCP segments received, by the network element, from a peer.

24. The machine-readable storage device of claim 13, further comprising sequences of instructions which when executed cause said resuming operation of the transport-layer protocol to comprise the network element sending, to a peer, a TCP segment that advertises a positive window size that reflects an amount of data that the second BGP speaker is capable of receiving from the peer.

* * * * *